Patented Sept. 3, 1940

2,213,783

UNITED STATES PATENT OFFICE 2,213,783

BENZOYL BENZOIC ACID ESTERS

Lucas P. Kyrides, St. Louis, Mo., assignor, by mesne assignments, to Monsanto Chemical Company, a corporation of Delaware No Drawing. Application October 5, 1929,
Serial No. 397,728

6 Claims. (Cl. 260—469)

The present invention relates to the art of organic chemicals manufacture and their use in the compounding of plastics and resins.

According to this invention there is provided a series of novel chemical compounds which possess a common valuable characteristic in that they impart valuable properties when incorporated in plastics and resins, such as—nitrocellulose, acetyl cellulose, phenol-aldehyde resins and Glyptal.

I have discovered that benzoyl benzoic acid reacts with alcohols including phenols, to form esters many of which have low melting points and all have high boiling points, which esters are neutral and may be manufactured at a cost which makes them of particular interest to the lacquer and resin manufacturer.

Benzoyl benzoic acid is manufactured on a large scale by causing phthalic anhydride to react with benzene in the presence of aluminum chloride. The acid group of this material is particularly active and I have found that it will react to form a large number of ester bodies. These may be made in the usual manner, for example, by causing the acid to react with the desired hydroxylic body, if necessary, in the presence of a catalytic agent. The resulting ester may be isolated in any well known manner, such as—by washing with sodium carbonate and distilling in vacuo. Other standard methods of preparing the esters may be employed.

Following the above procedure I have prepared a large number of esters which are respresentative of the class hereinabove set forth. These include: the benzyl alcohol ester of benzoyl benzoic acid (M. P. 63° C.; B. P. about 390° C.); the reaction product of the monomethyl ether of ethylene glycol and benzoyl benzoic acid (B. P. about 378° C.); the cyclohexanol ester of the acid and others.

These new compounds are representative of a class to which may be given the following structural formula:

a specific example of which is the monomethyl ether of ethylene glycol reaction product with benzoyl benzoic acid, having the following structural formula—

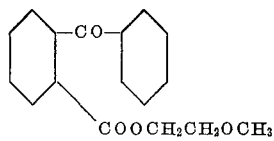

R and R' as represented above may be simple aromatic nucleuses, such as benzene or derivatives of this material, including the chlor and methyl derivatives and X may be a radical of alcoholic origin, whether aliphatic or aromatic, saturated or unsaturated, open chain or cyclic and includes the aliphatic alcohols having more than two carbon atoms polyhydroxylic alcohols such as, glycol, glycerine, alcohols embodying an aromatic nucleus, such as benzyl alcohol, its homologues and derivatives including 4 chlor benzyl alcohol and 2,4 dichlor benzyl alcohol, cyclohexanols, phenols, partially substituted polyhydroxylic alcohols, such as the monomethyl or ethyl ether of ethylene glycol and similar materials falling within this class.

Materials falling within the class hereinabove described and including the methyl and ethyl esters impart desirable properties when incorporated in resins and plastic bodies, and may be employed advantageously as plasticizers or high boiling solvents. A characteristic film embodying the principles of the invention may be made by mixing together:

Wet nitrocellulose (80% dry nitrocellulose—
  20% alcohol) _____kilograms____ 28.5
Solvent_____liters____ 95
Plasticizer _____do_____ 10
Stabilizer (urea) _____kilograms___  .2

The solvent is prepared by mixing together:

Benzene _____gallons___ 10
Ethyl acetate_____do_____  9
Grain alcohol (96%) _____do_____ 10
Amyl acetate_____do_____  2
Normal butyl alcohol_____do_____  1

The fluid mixture embodying the ingredients of the above designated formula is spread, for evaporation, on a smooth surface, where it forms a clear, tough, stable film product, having properties which are superior in many respects to a film formed with dibutyl phthalate as the plasticizing constituent. Obviously, the proportions specified may be varied within wide limits to meet the requirements of the ultimate product.

The ester compositions are suited for the plasticization of resinous bodies, including phenol-aldehyde and Glyptal. For this purpose the phenolic and aldehydic bodies are caused to react initially in the usual manner, water being driven off from the reacting mixture. Subsequently, and while the mixture is still in a molten state, the ester in amounts varying from 3 to 30% by weight of the resin is incorporated and thoroughly mixed therewith to form a compatible mass, the resulting mixture being rendered infusible by heat treatment in the usual manner. The ester functions as a plasticizing composition and improves the physical characteristic of the resultant product.

Although there are described representative compounds and the manner of their use which characterize my invention, it will be apparent to those skilled in the art that the invention is not limited to the composition hereinabove specified, but is applicable to a broad class, of which those materials enumerated are representative. I desire, therefore, that it be restricted only as indicated in the appended claims.

What I claim is:

1. An ester of a benzoyl benzoic acid and a polyhydroxylic alcohol.
2. An ester of a benzoyl benzoic acid and a partially substituted polyhydroxylic alcohol.
3. An ester of a benzoyl benzoic acid and monomethyl ether of ethylene glycol.
4. An ester of benzoyl benzoic acid and a partially substituted dihydric alcohol.
5. An ester of benzoyl benzoic acid and an alkyl ether of ethylene glycol.
6. An ester of a benzoyl benzoic acid and a polyhydroxylic alcohol which is substituted with respect to the hydrogen atom of a hydroxyl group.

LUCAS P. KYRIDES.